US 6,567,912 B1

(12) United States Patent
Belkin et al.

(10) Patent No.: US 6,567,912 B1
(45) Date of Patent: May 20, 2003

(54) METHOD AND APPARATUS FOR ROBUST INITIALIZATION OF DEVICES

(75) Inventors: Anatoly Belkin, Mt. Prospect, IL (US); Edward Benyukhis, Glenview, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/539,387

(22) Filed: Mar. 31, 2000

(51) Int. Cl.[7] .............................................. G06F 9/445
(52) U.S. Cl. ............................................. 713/2; 710/10
(58) Field of Search ......................... 713/1, 2; 710/8, 710/10; 709/222

(56) References Cited

U.S. PATENT DOCUMENTS

| 5,379,431 A | * | 1/1995 | Lemon et al. ................ 710/10 |
| 5,696,968 A | * | 12/1997 | Merkin ........................... 713/2 |
| 6,154,836 A | * | 11/2000 | Dawson, III et al. ........... 713/1 |
| 6,374,352 B1 | * | 4/2002 | Goldman et al. ............... 713/1 |
| 6,397,268 B1 | * | 5/2002 | Cepulis ........................... 710/8 |

* cited by examiner

Primary Examiner—Thomas M. Heckler
(74) Attorney, Agent, or Firm—Jeffrey K. Jacobs

(57) ABSTRACT

A method and apparatus for robust initialization of a digital control apparatus that is coupled to a plurality of devices (e.g., 112, 114, and 116) having a plurality of boot routines (118) in memory (e.g., 108) with each of the boot routines being associated with one of the devices. A boot marker (120) in memory (e.g., 108) that is capable of selectively associating a boot routine with a device (e.g., 112, 114, or 116) and a controller (104) that initializes the devices based on which of the boot routines is associated with the boot marker.

20 Claims, 2 Drawing Sheets

METHOD AND APPARATUS FOR ROBUST INITIALIZATION OF DEVICES

FIELD OF THE INVENTION

The present invention relates generally to system initialization and, specifically to, robust initialization of multiple devices in a system.

BACKGROUND OF THE INVENTION

Currently, when a computerized system is initialized, a number of boot programs associated with different devices are loaded into memory or are present in read only memory (ROM). A controller is initially started and loaded with a boot program commonly referred to as an "initial program load" (IPL). Upon execution of the IPL program, the controller enables the other devices to be initialized by their respective boot programs. The controller does not resume normal operation until the initialization of the system is complete and the IPL program finishes execution. The lack or loss of control over the IPL procedures results in the loss of system functionality when the file system or memory containing the IPL program is corrupted preventing complete initialization of the system.

Disadvantageously, when the system fails to properly initialize another IPL must occur. Accordingly, there is a need in the art for a method and apparatus for decreasing the time of outages due to IPL program failures while increasing system integrity and availability.

DETAILED DESCRIPTION OF THE PREFERRED EMBODIMENTS

To overcome the problems described above, a boot marker and watch dog timer are used to identify what device is being initialized. Upon initialization failure of the current device, the watch dog timer enables the boot marker to be updated and the next device initialized. Thus assuring the IPL program will end execution and system execution returned to the controller.

Figure 1:
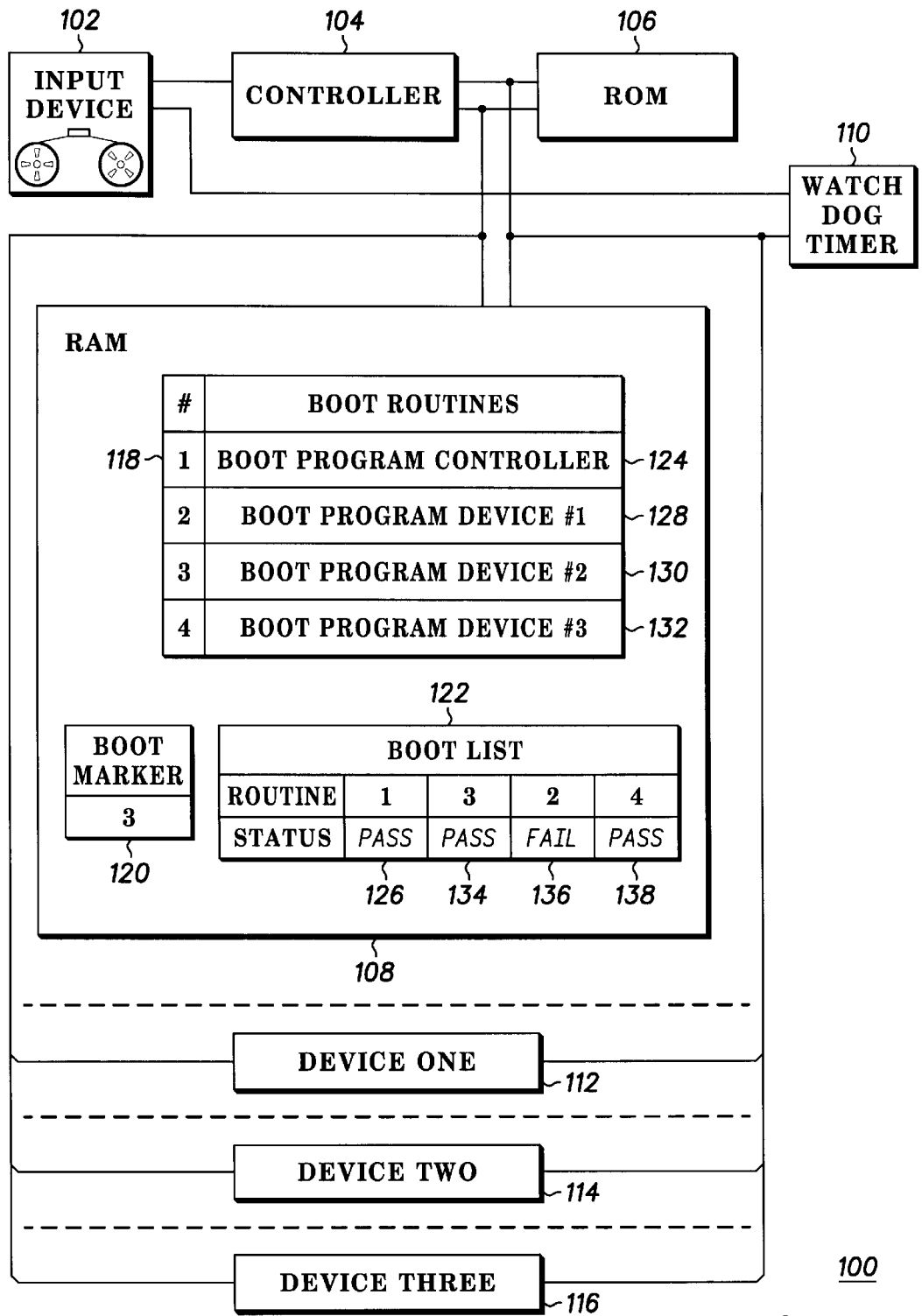
FIG. 1. is a block diagram of a computer system having a controller and multiple devices in accordance with an embodiment of the invention.

In FIG. 1, a block diagram of a computer system 100 having a controller and multiple devices in accordance with an embodiment of the invention is shown. The system 100 has an input device 102 coupled by a data bus and address bus to a controller 104 and a Random Access Memory 108 (RAM). The controller 104 is coupled to the input device 102, read only memory (ROM) 106, RAM 108, an activity or watch dog timer 110, device one 112, device two 114, and device three 116. In the current embodiment the devices are shown as residing within the system, but in alternate embodiments the devices may selectively be independent single board computers coupled to the controller by an external bus. The above elements are all coupled together by an address bus and a data bus. Additionally, stored in the RAM 106 is an area 118 for a plurality of boot routines 124, 128, 130, 132, boot marker 120, and a boot list table 122.

Upon initialization or power-up of the system, the controller 104 loads a program from ROM 106 to enable access to an input device. An IPL program for initializing the system is accessed and loaded via the input device 102. The input device 102 shown is a tape unit, but in alternate embodiments other devices, such as disk drives, CD drives, punch card readers, electrical switches, or mechanical switches, may be used to load the IPL program.

The IPL program is stored by the controller 104 in RAM 108. The IPL program contains the boot routines or programs for initializing the other devices of the computer system. The plurality of boot routines from the IPL program are stored in a boot routine area of memory 118 with each boot routine having an unique identifier (i.e. starting memory address for the routine). In an alternate embodiment, a power supply is coupled to the RAM or the use of complementary metal oxide semiconductor CMOS RAM enable the system while powered down to maintain the IPL program removing the need to load the IPL program from tape during system initialization, thus reducing outage time.

The boot list 122 is created in memory corresponding to the boot routines in the boot routine area of memory 118. The boot list 122 identifies the order the boot routines are initialized and maintains the status (success or failure) of each routine. The boot marker 120 is a pointer into the boot list that identifies the next boot routine to be executed.

In alternate embodiments, link lists or other data structures are used to identify the boot routines and the pointer into that data structure is the boot marker. Therefore, the boot routine area, boot list, and boot marker may selectively be implemented as one structure, rather than the three data structures shown in the present embodiment.

The first routine to boot in the present embodiment is the controller 104. The controller 104 updates the boot marker to be associated with the next device in the boot list (device two 114). Upon initialization with the IPL program, the controller 104 loads and executes the boot program controller routine 124. Upon successful initialization, the boot list 122 is updated and the status of routine one 126 is marked as "pass" (i.e. 1=pass, 0=fail). After initialization of the controller 104, the watch dog timer 110 is started, device two 114 is initialized with the "boot program device #2" routine 130, and the boot marker 120 is updated with the next device in the boot list 122(device one 112). The initialization of device two 114 is completed before the watch dog timer 110 expires.

Upon successful initialization of device two 114, the status in the boot list 122 is marked as "pass" 134, the watch dog timer 110 is reset, and device one 112 is initialized. The initialization of device one 112 results in the boot marker 120 being updated to device three 116. The initialization of device one 112 does not occur before the watch dog timer 110 expires.

The watch dog timer 110 expires and the controller 104 ends the initialization attempt of device one 112. The controller 104 marks the status for device one 112 in the boot list 122 as "fail" 136. The next device initialization, identified by the boot marker 120 (device three 116) is started and the watch dog timer 110 is reset. The boot marker 120 is updated to identify the next routine to run, but there are no more devices to initialize. Therefore, the boot marker 120 is pointed to the routine marked as failed 136 in the boot list 122 in a second attempt to successfully initialize the device. Device three initializes before the watch dog timer expires and the status of "pass" 138 is entered into the boot list 122.

The boot marker points to the failed device one 112 resulting in a second attempt at initialization. Initialization of device one 112 is started and the watch dog timer 110 is reset. There are no other initialization failures, so the boot marker is set to an "end of list" code. If device one 112 properly initializes, then the status of routine two 128 is updated in the boot list 122 to reflect "pass". If device one 112 fails a second time and the watch dog timer expires, then the status is updated (or maintained) as "fail".

After all devices have been initialized or two attempts have been made to initialize failed devices, the IPL program completes execution and the controller 104 is released to perform other functions. Thus, the failure of a device does not prevent the system from initializing resulting in outages being limited to only the failed device.

Figure 2:
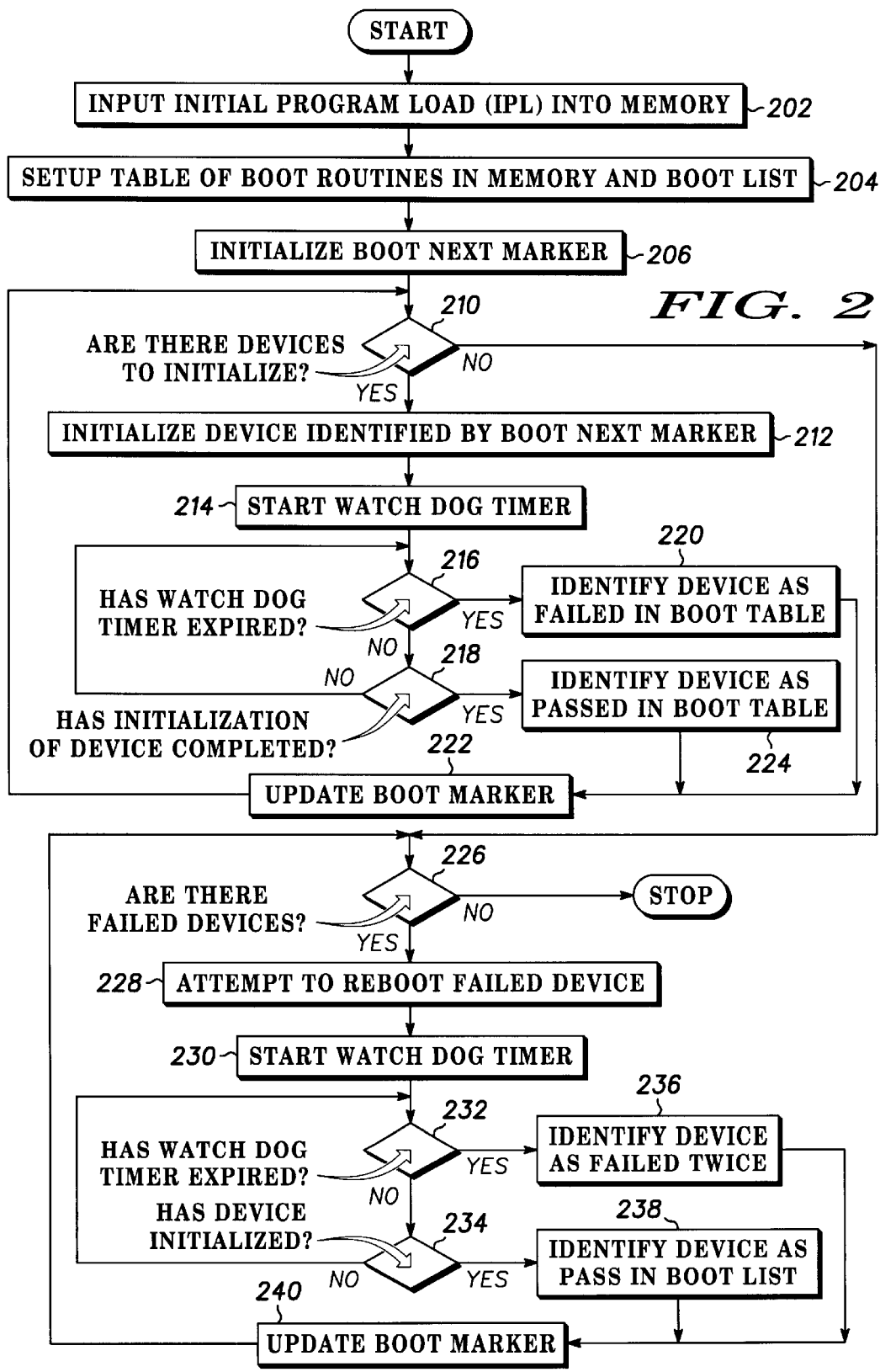
FIG. 2. is a flow diagram of the steps of robust initialization of a system with multiple devices in accordance with an embodiment of the invention.

Turning to FIG. 2, a flow diagram of the steps of robust initialization of a system with multiple devices in accordance with an embodiment of the invention is shown. In step 202, a IPL program is loaded via the input device 102, FIG. 1 into RAM 108 by the controller 104. The IPL program contains boot routines for the devices that make up the system and are placed into a table of boot routines 118 in RAM 108 and the boot list 122 in step 204, FIG. 2. The boot marker 120, FIG. 1, is initialized in step 206, FIG. 2 to identify the first boot routine to be executed.

In step 210, the boot marker 120, FIG. 1, is checked to verify that there are devices to initialize. If the boot marker 120 identifies a device to initialize, then the initialization routine is executed for that device in step 212 and the watch dog timer 110, FIG. 1, is started in step 214, FIG. 2.

If the watch dog timer 110, FIG. 1, has not expired in step 216, then the completion of device initialization is checked in step 218. If device initialization is complete in step 218, then in step 224 the status is marked as pass in the boot list 122, FIG. 1, and in step 222, FIG. 2, the boot marker is updated to the next device in the boot list 122, FIG. 1. If initialization of the device is not complete then step 216, FIG. 2, and 218 are repeated until either the watch dog timer 110, FIG. 1, expires or the device successfully initializes. If the watch dog timer 110, FIG. 1, expires in step 216, FIG. 2, then in step 220, FIG. 2, the initialization status of the device is marked as a "fail" in the status field of the boot list 122, FIG. 1, and in step 222, FIG. 2 the boot marker is updated to identify the next device to be initialize. After the boot marker has been updated in step 222, a check for more devices to be initialized occurs in step 210.

If in step 210, an attempt to initialize all devices has been completed, then in step 226 a check is made for any initialization failures. In step 228, an attempt is made to reboot the first identified failed device in the boot list 122, FIG. 1, and in step 230, FIG. 2, the watch dog timer 110, FIG. 1, is started.

The watch dog timer 110 is checked in step 232, FIG. 2, and if it has not expired, then in step 234, the initialization of the device is checked for completion. If the watch dog timer 110, FIG. 1, has not expired in step 232 and initialization of the device is not complete in step 234, then step 232 and 234 are repeated.

If the watch dog timer 110, FIG. 1, is expired in step 232, FIG. 2, then in step 236 the status in the boot list 122, FIG. 1, is marked as "Fail" for a second time and in step 240, FIG. 2, the boot marker 120, FIG. 1, is updated to identify the next device that previously failed initialization. In an alternate embodiment, a distinction between fail and fail for a second time is recorded in the boot list. If in step 234, FIG. 2, the initialization of the device is complete, then in step 238, the status in the boot list 122, FIG. 1 is identified as "pass" and in step 240 the boot marker, 120, FIG. 1, is updated to point to the next device that failed initialization. Once the boot marker 120 is updated in step 240, FIG. 2, step 226 is repeated. In step 226, if there are no devices that have failed initialization once, then the process is complete. Thus, the system is able to increase system availability and reduce the effects of device failure during initialization.

While the invention has been particularly shown and described with reference to a particular embodiment, it will be understood by those skilled in the art that various changes in form and details may be made therein without departing from the spirit and scope of the invention and it is intended that all such changes come within the scope of the following claims.

What is claimed is:

1. A digital control apparatus coupled to a plurality of devices comprising:
   a plurality of boot routines each of which is associated with at least a first one of the devices;
   a boot marker being capable of selectively associating with at least one of the boot routines; and
   a controller for initializing at least a first one of the devices based on which of the at least one boot routine is associated with the boot marker.

2. The apparatus of claim 1 further comprising a boot control routine which selectively associates the boot marker with the first one of the boot routines associated with the first one of the devices and selectively associating the boot marker with a second one of the boot routines in response to initialization of the first one of the devices.

3. The apparatus of claim 2 in which the plurality of devices is a plurality of single board computers.

4. The apparatus of claim 1 further comprising a boot control routine which selectively associates the boot marker with the first one of the boot routines associated with the first one of the devices and selectively associating the boot marker with a second one of the boot routines in response to initialization failure of the first one of the devices.

5. The apparatus of claim 4 further comprising a timer having a predetermined value that upon expiration signals initialization failure of the first one of the devices.

6. The apparatus of claim 1 further comprising a memory coupled to the controller which stores the boot marker.

7. The apparatus of claim 6 in which the memory is able to store the boot marker while the digital control apparatus is powered down.

8. The apparatus of claim 7 in which the memory is a complementary metal oxide semiconductor random access memory (CMOS RAM).

9. An apparatus coupled to a plurality of devices comprising:
   a memory loaded with an initial program load (IPL) routine having a boot marker selectively associating at least one of a plurality of boot routines with a first one of the devices; and
   a controller coupled to the memory and the plurality of devices with the controller executing the at least one of the plurality of boot routines in response to the boot marker selectively associating the at least one boot routine of the plurality of boot routines with the first one of the devices.

10. The apparatus of claim 9 further comprising a second one of the devices selectively associated with a second one of the boot routines by the boot marker in response to the completion of initialization of the at least one of the boot routines of the first one of the devices.

11. The apparatus of claim 9 further comprising an activity timer coupled to the controller, wherein an expiration of the activity timer indicates the completion of the initialization of the first one of the devices to the controller.

12. The apparatus of claim 11 in which the activity timer has a predetermined value stored in the memory.

13. A method of initialization of a system coupled to a plurality of devices comprising the steps of:

examining a boot marker during initialization of the system;

initializing at least a first one of the devices identified by the boot marker; and updating the boot marker to identify a second one of the devices.

14. The method of initialization of claim 13 wherein the step of updating further comprises the step of completing the initialization of the first one of the devices prior to the step of updating.

15. The method of initialization of claim 13 further comprising the step of re-initializing the first one of the devices identified by the boot marker in response to completion of initialization of the first one of the devices resulting from initialization failure.

16. The method of claim 15 wherein the step of re-initializing further includes the step of determining that an attempt to initialize each of the plurality of devices has occurred.

17. The method of claim 13 including the step of associating the boot marker with the first one of the devices.

18. The method of claim 17 wherein the step of associating the boot marker further comprises the steps of identifying a pointer location for the first one of the devices, and assigning the pointer location to a boot next pointer.

19. An article of manufacture comprising:

a computer usable medium having computer readable program code means embodied therein for initialization of a system, the computer readable program code means in said article of manufacture having;

means having a first computer readable program code for examining a boot marker, means having a second computer readable program code for initializing a device in the system identified by the boot marker, and means having a third computer readable program code for updating the boot marker to identify another device in the system.

20. The article of manufacture of claim 19 in which the first computer readable program code means in said article of manufacture further comprises a computer readable program code means for detecting failure of the initializing of the device.

* * * * *